United States Patent Office 2,739,972
Patented Mar. 27, 1956

2,739,972

CONDENSATION PRODUCTS OF DIALDEHYDES WITH 1,2-ALKYLENE OXIDES

Leslie Stephen Abbott, Banstead, Donald Faulkner, Epsom, and Charles Edward Hollis, Ewell, England, assignors to The Distillers Company Limited, Edinburgh, Scotland, a British company No Drawing. Application March 17, 1952,
Serial No. 277,066

Claims priority, application Great Britain March 30, 1951

9 Claims. (Cl. 260—340.9)

This invention relates to the preparation of a new class of compounds useful as plasticisers.

It has been found that aliphatic and cycloaliphatic dialdehydes condense with polyhydric alcohols in which the carbon atoms bearing the hydroxyl groups are separated by at most one carbon atom, or alkylene oxides to produce polyacetals which are valuable, inter alia, as plasticisers.

Accordingly, the present invention is for a process for the manufacture of plasticisers which comprises condensing a dialdehyde with a compound selected from the group consisting of the aforesaid monomeric polyhydric alcohols and alkylene oxides, and isolating the polyacetal formed. The condensation may be carried out to produce a polyacetal of low or high molecular weight, as is desired. The polyacetals of the present invention are plasticisers for cellulose derivatives such as for example, cellulose acetate, cellulose nitrate and ethyl cellulose.

The condensation of the dialdehyde and the aforesaid polyhydric alcohol or alkylene oxide may be carried out under any conditions used or described in the art for carrying out condensations of alcohols with aldehydes. The condensation is preferably carried out in the presence of a catalyst for this type of reaction. As catalysts which are suitable for use may be mentioned anhydrous hydrogen chloride and acids such as hydrochloric acid, phosphoric acid, formic acid, and the like. For the condensation of alkylene oxides with dialdehydes, the metal halides such as stannic chloride and the like are also suitable as catalysts.

The molar proportions of the dialdehyde and aforesaid polyhydric alcohol or alkylene oxide may vary over a wide range. It is preferred to employ about one molar equivalent of polyhydric alcohol (where one molar equivalent corresponds to two free hydroxyl groups) or two moles of alkylene oxide per mole of dialdehyde. Thus it is preferred to use 2 moles of a dihydric alcohol or 1 mole of a tetrahydric alcohol, per mole of the dialdehyde. If desired, an excess of one or other of the reactants over these proportions may be used.

The condensation may be carried out at room temperature or at elevated temperatures, for example up to about 250° C. It is preferred in most cases to use lower temperatures at the commencement of the condensation reaction and to employ higher temperatures towards the termination of the condensation reaction. The reaction may be carried out at any convenient pressure.

Organic solvents for one or more of the reactants, and particularly organic solvents which form low boiling azeotropes with water, or inert diluents, may be employed. Suitable solvents include hydrocarbons such as benzene, xylene and the like and chlorinated hydrocarbons such as chloroform, carbon tetrachloride and the like. It has been found very suitable to carry out the reaction in an inert atmosphere, and this may be maintained for example by bubbling an inert gas such as nitrogen through the reaction mixture. Suitably the reaction mixture is agitated during the course of the reaction.

The polyhydric alcohol employed may be aliphatic or aromatic, and preferably contains 2, 3 or 4 hydroxy groups. It has been found that good results are obtained when employing aliphatic polyhydric alcohols such as ethylene glycol, glycerol, pentaerythritol, butylene-1:3-glycol, 4-vinylcyclohexane-1:2-diol and glycerol monocresyl ether. The alkylene oxide employed may suitably be ethylene oxide or propylene oxide.

In the condensation of the alkylene oxides, and particularly ethylene oxide, with the dialdehydes, the condensation should be carried out under anhydrous conditions, and desirably the reaction mixture should be protected from moist air. It has been found in this condensation that by prolonging the reaction period an increase in viscosity of the product may be obtained.

The dialdehyde starting material may be an aliphatic or cycloaliphatic, substituted or unsubstituted. Examples of suitable dialdehydes which it is now preferred to employ include the cyclohexane dialdehydes, glutardialdehyde, 2-methoxymethyl-2:4-dimethylpentane-1:5-dial and 2-ethoxymethyl-2:4-dimethylpentane-1:5-dial.

The polyacetal condensation products obtained range from viscous liquids of low molecular weight distillable at reduced pressure to solid resinous products of high molecular weight depending on the starting materials and the condensation conditions. The products of the present invention in addition to being plasticisers find application in the plastics and surface coatng fields. The higher molecular weight polyacetyl condensation products, and especially those prepared from glycerol, are valuable plasticisers for cellulose derivatives.

The following examples are given to illustrate the process of the present invention. The parts and percentages referred to in the examples are by weight.

*Example 1*

6.6 parts of an ethylene glycol solution of anhydrous hydrogen chloride (containing 0.22 part of hydrogen chloride) are added to 24.4 parts of ethylene glycol and 17.2 parts of 2-methoxymethyl-2:4-dimethylpentane-1:5-dial are added to the mixture with stirring and cooling, the temperature being held below 20° C. After standing overnight at room temperature, the hydrogen chloride is removed under reduced pressure and the unreacted glycol and dialdehyde are separated from the product by distillation.

11.8 parts of a clear, colourless, viscous liquid, boiling point 130° C. at 1 millimetre mercury pressure, refractive index $n_D^{20}$ 1.4658, are obtained, which is immiscible with water and compatible with organic solvents. It is a good plasticiser for cellulose derivatives.

A 16% solution of cellulose acetate in acetone is prepared and mixed with an acetone solution of the acetal in amount such that the acetal/cellulose acetate ratio is 1/2. A flexible clear sheet is obtained on casting from this solution.

*Example 2*

The procedure described in Example 1 is used, with the exception that 12.5 parts of ethylene glycol and 34.4 parts of 2-methoxymethyl-2:4 - dimethylpentane-1:5-dial are used. The reaction mixture is allowed to stand overnight at room temperature and is then distilled to remove hydrogen chloride, glycol and dialdehyde starting material and a little higher boiling material reaching, finally, a temperature of 200° C. at a pressure of 1 millimetre of mercury. The product while hot is a pale clear viscous liquid; it solidifies on cooling to a hard clear resin, which is insoluble in water, and soluble in organic solvents. It is a good plasticiser for cellulose derivatives, and may be used to plasticise cellulose acetate as described in Example 1, giving a clear flexible sheet.

Example 3

The process of Example 2 is repeated using 0.2% of phosphoric acid in place of the hydrogen chloride used therein. The acid is not removed before the distillation step. A clear and almost colourless balsam is obtained which is insoluble in water and soluble in organic solvents. It is a good plasticiser for cellulose derivatives, and may be used to plasticise cellulose acetate as described in Example 1, giving a clear flexible sheet.

Example 4

The procedure described in Example 1 is repeated with the exception that the 2-methoxymethyl-2:4-dimethylpentane-1:5-dial is successively replaced by equimolar proportions of 1:3-cyclohexane dialdehyde, 1:4-cyclohexane dialdehyde, and 2-ethoxymethyl-2:4-dimethylpentane-1:5-dial. The products obtained are plasticisers for cellulose derivatives, and may be used to plasticise cellulose acetate as described in Example 1, giving a clear flexible sheet.

Example 5

68.8 parts of 2-methoxymethyl-2:4-dimethylpentane-1:5-dial are added under conditions similar to those used in Example 3 to 24.6 parts of glycerol. The reaction is slower than in Example 3 and the reaction mixture is allowed to stand 21 hours, and is then heat-treated under vacuum, according to the following schedule:

| Bath Temp., °C. | Pressure, mm. Hg. | Total heating time, hours |
| --- | --- | --- |
| 100 | 18 | 1 |
| 100 | 8 | 3 |
| 110 | 1 | 9 |
| 150 | 1 | 11 |
| 180 | 1 | 12 |

The product cooled to a dark semi-solid resinous material, which is insoluble in water and soluble in organic solvents. This product is an excellent plasticiser for cellulose derivatives, and may be used to plasticise cellulose acetate as described in Example 1, giving a clear flexible sheet.

Example 6

The procedure described in Example 5 is repeated, with the exception that an equimolar proportion of glycerol is employed. The product is lighter in colour and somewhat more soft and sticky than the product of Example 5, and is insoluble in water and soluble in organic solvents. It is an excellent plasticiser for cellulose derivatives and may be used to plasticise cellulose acetate as described in Example 1, giving a clear flexible sheet.

Example 7

27.2 parts of pentaerythritol are refluxed with 20 parts of water containing 0.2% on total reactants of 90% phosphoric acid. 34.4 parts of 2-methoxymethyl-2:4-dimethylpentane-1:5-dial are added gradually to the mixture. Towards the end of the addition, the pentaerythritol dissolves completely, and refluxing is continued for an hour. Heating of the reaction mixture is then continued, allowing the water present and that which forms during the reaction to distill off. The temperature of the reaction mixture rises to 130° C. after 1½ hours, and when all the water has been removed the temperature is raised to 180° C. over a quarter of an hour. The pressure is then further reduced to 1–2 millimetres of mercury, and these conditions are held for half an hour. The product flows with difficulty at this temperature, but when poured hot on to a cold surface gives, on cooling, a clear very hard and slightly yellow-coloured resin. Heating at lower temperatures during the latter stages of the treatment yields a clear, very hard pale straw-coloured resin. Both resins are soluble in organic solvents and insoluble in water, and are plasticisers for cellulose derivatives. They may be used to plasticise cellulose acetate as described in Example 1, giving a clear flexible sheet.

Example 8

The procedure described in Example 7 is repeated with the exception that the 2-methoxymethyl-2:4-dimethylpentane-1:5-dial is replaced by an equimolar proportion of 2-ethoxymethyl-2:4-dimethylpentane-1:5-dial. The polyacetal obtained is a plasticiser for cellulose derivatives and may be used to plasticise cellulose acetate as described in Example 1, giving a clear flexible sheet.

Example 9

6.8 parts of pentaerythritol and 7.0 parts of a mixture of 1:3- and 1:4-cyclohexane-dialdehydes are reacted together in the manner described in Example 7. After refluxing the mass is heated under a nitrogen stream for 1 hour, with the temperature rising from 110° C. to 180° C. The mass becomes extremely viscous and finally solid, and it is necessary to raise the temperature to 240° C. to gain fluidity. The temperature is then maintained between 240° and 250° C. for an hour, during which time a little more water distills off. Pressure is then reduced to 12 millimetres of mercury, and the temperature is raised during an hour and a half to 260° C. to keep the mass fluid. The product on cooling is a brown hard resin of extremely high melting point, which is a plasticiser for cellulose derivatives, and may be used to plasticise cellulose acetate as described in Example 1, giving a clear flexible sheet.

Example 10

43 parts of 2-methoxymethyl-2:4-dimethylpentane-1:5-dial and 11 parts of ethylene oxide are mixed with cooling to prevent the oxide evaporating, and the cold mixture is added slowly with stirring to a solution of 2 parts of stannic chloride in 80 parts of anhydrous carbon tetrachloride. Immediately the markedly exothermic reaction, which is kept under control by vigorous stirring and cooling has abated, the reaction mixture is added with stirring to a dilute solution of sodium carbonate. The oil layer is separated, washed with water and the washings and the aqueous layers are both extracted with carbon tetrachloride. The combined carbon tetrachloride extracts are dried over anhydrous sodium sulphate, stripped and distilled. On redistillation the main fraction is a clear, colourless mobile liquid, of boiling point 108–110° C. at 1–2 millimetres of mercury pressure, refractive index $n_D^{20}$ 1.4472, comprising the bis-cyclic acetal of ethylene glycol and 2-methoxymethyl-2:4-dimethylpentane-1:5-dial, of the following formula:

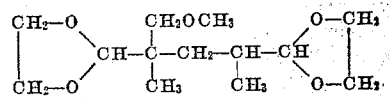

This is a plasticiser for cellulose derivatives and may be used to plasticise cellulose acetate as described in Example 1, giving a clear flexible sheet.

Example 11

The same proportions of 2-methoxymethyl-2:4-dimethylpentane-1:5-dial and ethylene oxide are mixed as described in Example 10, with the exception that the mixture is added to only 1 part of stannic chloride dissolved in 80 parts of anhydrous carbon tetrachloride, the temperature being maintained carefully between 25° and 30° C. Addition having been completed, the mixture is stirred for two to three hours until the temperature falls to room temperature without using a cooling bath. Working up as in Example 10 yields only a small proportion of distillable product, similar to that obtained in the previous example, while the remainder of the product consists of a light-coloured semi-solid resin not appreciably volatile up to at least 200° C. and under 1 mm. of mercury pressure. This resin is a good plasticiser for cellulose derivatives and is soluble in organic solvent and insoluble in water. This resin may be used to plasticise cellulose acetate as described in Example 1, giving a clear flexible sheet.

*Example 12*

43 parts of 2-methoxymethyl-2:4-dimethylpentane-1:5-dial and 22 parts of ethylene oxide are mixed and added cold to 2 parts of stannic chloride dissolved in 80 parts of anhydrous carbon tetrachloride in the manner described in the previous example. When addition of the reactants is complete, the reaction is allowed to proceed between 24° and 30° C. until the temperature begins to fall, without using a cooling bath (2–3 hours) and the mixture is allowed to stand overnight. Working up of the product in the manner described in the last example yields a small amount of a low molecular weight distillable product similar to the product obtained in Example 10, together with a main product consisting of a pale, almost water-white viscous resin, similar to that of Example 11. This resin is a good plasticiser for cellulose derivatives and is soluble in organic solvents and insoluble in water. This resin may be used to plasticise cellulose acetate as described in Example 1, giving a clear flexible sheet.

*Example 13*

The procedure described in Example 10 is repeated with the exception that the 2-methoxymethyl-2:4-dimethylpentane-1:5-dial is successively replaced by equimolar proportions of 1:3-cyclohexane dialdehyde, 1:4-cyclohexane dialdehyde and 2-ethoxymethyl-2:4-dimethylpentane-1:5-dial.

*Example 14*

200 parts of 2-methoxymethyl-2:4-dimethylpentane-1:5-dial and 58 parts of propylene oxide are mixed together and added with stirring to 1 part of stannic chloride dissolved in 160 parts of carbon tetrachloride at a temperature of 50–60° C. The mixture is refluxed at this temperature for 3 hours, after which time the mixture is distilled to a final kettle temperature of 200° C. to remove any unreacted propylene oxide, carbon tetrachloride and other low boiling materials. The residue obtained is cooled and dissolved in carbon tetrachloride, neutralised with 5% aqueous sodium carbonate solution, filtered, refluxed with charcoal and finally distilled giving the bis-cyclic acetal of propylene glycol and 2-methoxymethyl-2:4-dimethylpentane-1:5-dial (boiling point 134–136° C. at 10–12 mm. mercury pressure, refractive index $n_D^{20}$ 1.4540) which is of the formula:

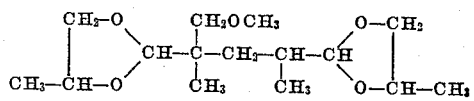

This is a plasticiser for cellulose derivatives, and may be used to plasticise cellulose acetate as described in Example 1, giving a clear flexible sheet.

*Example 15*

A mixture of 368 parts of glycerol, 250 parts of xylene and 2.5 parts of 90% aqueous phosphoric acid are refluxed together and 400 parts of 2-methoxymethyl-2:4-dimethylpentane-1:5-dial are added to the mixture in four batches over a period of 2 hours. The reaction mixture obtained is refluxed for a further 5 hours after which time separation of the water has ceased and then 160 parts of xylene are distilled off, the temperature of the reaction mixture rising to 180° C. The reaction mixture obtained is neutralised with aqueous sodium bicarbonate solution, whereupon the mixture stratifies into two layers. The upper aqueous layer is separated and extracted with carbon tetrachloride, the extract obtained being added to the lower layer. The combined solution thus obtained is separated into two layers, and the upper layer is extracted with carbon tetrachloride and the extract separated and distilled up to a temperature of 190° C. under a pressure of 2 mm. mercury, the residue obtained being a clear, lightly coloured viscous material which is an excellent plasticiser for cellulose acetate. This material may be used to plasticise cellulose acetate as described in Example 1, giving a clear flexible sheet.

*Example 16*

The procedure of Example 15 is repeated with the exception that the glycerol employed is replaced with an equimolar proportion of butylene 1:3-glycol. The reaction mixture obtained is neutralised as in Example 17 with aqueous sodium carbonate solution, washed with water, dried and then distilled, yielding a fraction boiling at 130° to 135° C. at 1 mm. mercury pressure as a clear slightly yellow viscous liquid which is a plasticiser for cellulose derivatives. This material may be used to plasticise cellulose acetate as described in Example 1, giving a clear flexible sheet.

*Example 17*

200 parts of 2-methoxymethyl-2:4-dimethylpentane-1:5-dial and 284 parts of 4-vinyl cyclohexane-1:2-diol are mixed together and added over a period of 1½ hours to a refluxing mixture comprising 105 parts of xylene, 1.2 parts of 90% aqueous phosphoric acid. When this addition is complete 44 parts of xylene are distilled off and then the refluxing continued until separation of water ceases, whereupon a further 44 parts of xylene are distilled off gradually, while the temperature rises to 190° C., the mixture being maintained at this temperature for 4 hours. The product is worked up as described in Example 17, the product being a viscous material which is a plasticiser for cellulose derivatives, and may be used to plasticise cellulose acetate as described in Example 1, giving a clear flexible sheet.

*Example 18*

The procedure of Example 17 is repeated with the exception that 4-vinyl cyclohexane-1:2-diol is replaced by an equi-molar proportion of glycerol monocresyl ether. The product obtained is worked up as described in Example 17, giving a viscous material which is a plasticiser for cellulose derivatives, and may be used to plasticise cellulose acetate as described in Example 1, giving a clear flexible sheet.

*Example 19*

20 parts of pentaerythritol, 31 parts of ethylene glycol and 21 parts of water containing 0.4 part of an aqueous 90% phosphoric acid solution are refluxed gently and 100 parts of 2-methoxymethyl-2:4-dimethylpentane-1:5-dial are added gradually over a period of two hours. A stirrer, still-head and condenser are then fitted to the flask and the reaction mixture is heated with stirring from a bath temperature of 120° C. to one of 180° C. over 5½ hours, water being distilled off as formed. The reaction mixture is then subjected to a reduced pressure of 12 mm. of mercury at 180° C. for one hour and finally at a pressure of 1 to 2 mm. of mercury pressure at 180° to 200° C. for an hour. The product on pouring onto a cooled surface cools to a clear hard and almost colourless resin which is softer than that obtained by using pentaerythritol alone. By repeating the process of this example, increasing the relative proportion of ethylene glycol, a softer resin may be obtained. These resins are excellent plasticisers for cellulose derivatives, and may be used to plasticise cellulose acetate as described in Example 1, giving a clear flexible sheet.

We claim:

1. A process for the manufacture of plasticisers which comprises condensing a dialdehyde selected from the group consisting of 1:3-cyclohexane dialdehyde, 1:4-cyclohexane dialdehyde, 2-methoxymethyl-2:4-dimethylpentane-1:5-dial and 2-ethoxymethyl-2:4-dimethylpentane-1:5-dial with a 1:2-alkylene oxide, and isolating the polyacetal formed.

2. A process as in claim 1, wherein the alkylene oxide is selected from the group consisting of ethylene oxide and propylene oxide.

3. A process as in claim 1, wherein the dialdehyde is 1:3-cyclohexane dialdehyde.

4. A process as in claim 1, wherein the dialdehyde is 1:4-cyclohexane dialdehyde.

5. A process as in claim 1, wherein the dialdehyde is 2-methoxymethyl-2:4-dimethylpentane-1:5-dial.

6. A process as in claim 1, wherein the dialdehyde is 2-ethoxymethyl-2:4-dimethylpentane-1:5-dial.

7. A process as in claim 1, wherein the reaction is carried out in the presence of a condensation catalyst.

8. A process as in claim 1, wherein the reaction is carried out in the presence of hydrogen chloride.

9. A process as in claim 1, wherein the reaction is carried out in the presence of a mineral acid.

References Cited in the file of this patent

UNITED STATES PATENTS

| | | |
|---|---|---|
| 2,497,303 | Gresham et al. | Feb. 14, 1950 |
| 2,526,702 | Smith | Oct. 24, 1950 |
| 2,643,236 | Kropa et al. | June 23, 1953 |

FOREIGN PATENTS

| | | |
|---|---|---|
| 892,443 | France | Jan. 10, 1944 |
| 892,444 | France | Jan. 10, 1944 |
| 502,245 | Belgium | Apr. 14, 1951 |
| 508,059 | Belgium | Jan. 15, 1952 |

OTHER REFERENCES

Hill et al.: J. Amer. Chem. Soc., vol. 51, May 1929, pages 1509, 1511, and 1514.

Bogert et al.: Journal American Chemical Society, 1933, vol. 55, pages 3741 to 3745.

Richter-Spielmann: Organic Chemistry, 2nd ed., vol. 1 (received U. S. Patent Office Aug. 14, 1928), page 346.